United States Patent
Gommans et al.

(10) Patent No.: US 9,322,525 B2
(45) Date of Patent: Apr. 26, 2016

(54) DAYLIGHT SENSING ARRANGEMENT FOR A HYBRID LUMINAIRE

(75) Inventors: Hendrikus Hubertus Petrus Gommans, Eindhoven (NL); Eduard Johannes Meijer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 270 days.

(21) Appl. No.: 14/234,504

(22) PCT Filed: Jul. 9, 2012

(86) PCT No.: PCT/IB2012/053505
§ 371 (c)(1),
(2), (4) Date: Jan. 23, 2014

(87) PCT Pub. No.: WO2013/014564
PCT Pub. Date: Jan. 31, 2013

(65) Prior Publication Data
US 2014/0191665 A1    Jul. 10, 2014

Related U.S. Application Data

(60) Provisional application No. 61/511,142, filed on Jul. 25, 2011.

(51) Int. Cl.
*F21S 19/00* (2006.01)
*H05B 37/02* (2006.01)

(52) U.S. Cl.
CPC .......... *F21S 19/005* (2013.01); *H05B 37/0218* (2013.01); *Y02B 20/46* (2013.01)

(58) Field of Classification Search
CPC .................................................. H05B 37/0218
See application file for complete search history.

(56) References Cited

U.S. PATENT DOCUMENTS 8,810,137 B2 * 8/2014 Dahlen ............... H05B 37/0218
                                                    315/149
9,192,029 B2 * 11/2015 Marquardt ......... H05B 37/0254
(Continued)

FOREIGN PATENT DOCUMENTS

EP        2003393 A1    12/2008
WO    2009044330 A1     4/2009

OTHER PUBLICATIONS

David Carter; "Hybrid Lighting Systems" The 5th International Conference I,UMINAT 2009, Sustainable Lighting, Feb. 20, 2009, pp. 1-28.
(Continued)

*Primary Examiner* — Hai L Nguyen
(74) *Attorney, Agent, or Firm* — Meenakshy Chakravorty

(57) ABSTRACT

The disclosed embodiments relate to a daylight harvesting system (1). The daylight harvesting system comprises a light distribution device comprising a light inlet (2) for receiving incident light (3), and a light outlet (4) for providing output light (5) received by the light inlet into an interior space. A light sensor (6) is arranged to receive and measure a light level of the incident light and to provide a measurement signal representative thereof. Control circuitry (7) is arranged to receive the measurement signal, and to provide a control signal based on the measurement signal to an artificial light source (8) placed at the light outlet. The light sensor is placed relative the light inlet such that the incident light received by the light sensor exclusively is affected by the incident light as received by the light inlet.

13 Claims, 4 Drawing Sheets

(56) References Cited

U.S. PATENT DOCUMENTS

2002/0060283 A1 5/2002 Jordan et al.
2006/0007549 A1 1/2006 Zincone
2008/0007394 A1 1/2008 Roberts

OTHER PUBLICATIONS

Mohammeds. Mayhoub et al; "Hybrid Lighting Systems: A Feasiblitiy Study for Europe", University of Liverpool, School of Architecture, 2009.

* cited by examiner

DAYLIGHT SENSING ARRANGEMENT FOR A HYBRID LUMINAIRE

FIELD OF THE INVENTION

The present invention relates in general to a lighting system and in particular to an arrangement for transporting light from a light inlet to a light outlet in such a system.

BACKGROUND OF THE INVENTION

There is a lot of daylight available during the day which currently is hardly used in windowless spaces. In professional buildings in areas like washrooms, halls and stairs often artificial light is constantly burning during working hours.

Additionally it is often desired by people to have natural light wherever possible. Also, having more natural light available inter alia in hospitals is known to be welcomed by personnel as well as patients.

Several options are known where daylight is put to more effective use, such as light tubes used for transporting daylight into a building. The light tube typically has an inlet for receiving daylight at the roof of a building. The received daylight is transmitted through a pipe of the light tube to an outlet inside the building so as to illuminate the interior of the building. The resulting indoor light spot may have a shape which is dependent on the geometry of the inner light tube surface and also on the variation in sun position over a day. Thereby the diameter of the indoor light spot changes over the course of the day. To mask this dynamical spot variation at the light tube exit the arrangement is commonly fitted with one or more artificial light sources, such as LEDs, placed at the outlet of the light tube. The one or more artificial light sources may thereby enhance and/or complement the daylight whenever necessary to reach a desired light level, lighting effect or light colour. An arrangement comprising a light tube and one or more artificial light sources is commonly referred to as a hybrid arrangement.

SUMMARY OF THE INVENTION

The inventors of the disclosed embodiments have identified drawbacks associated with the techniques described above. For example, in order to know how to drive and control the one or more artificial light sources in the above described hybrid arrangement it may be advantageous to know the flux and colour of the daylight that is entering the light tube. However, since the position of the sun is dependent on the day, the time of year and the location of the light tube and the intensity and colour temperature of the sun depends on the weather conditions and the orientation of the light tube with respect to its surroundings, it may be advantageous to sense the attributes of the daylight. This is however not trivial due to the variability of the daylight. Further, because the entry angle of direct sunlight is continually changing it is not easy to find the right position and method to accurately measure the sunlight parameters.

It is therefore an object of the present invention to overcome these problems, and to provide an improved lighting system that provides light in an efficient way with low losses. Particularly, the inventors of the disclosed embodiments have discovered that placing the light sensor at the light inlet of the arrangement surprisingly improves the performance.

Generally, the above objectives are achieved by a daylight harvesting system comprising a light sensor, control circuitry, a light inlet and a light outlet as more specifically disclosed in the attached independent claim.

According to a first aspect of the invention, the above mentioned and other objects are achieved by a daylight harvesting system, comprising a light inlet for receiving incident light, and a light outlet for providing output light received by the light inlet into an interior space, a light sensor arranged to receive and measure a light level of the incident light and to provide a measurement signal representative thereof, and control circuitry arranged to receive the measurement signal, and to provide a control signal based on the measurement signal to an artificial light source placed at the light outlet, wherein the light sensor is placed relative the light inlet such that the incident light received by the light sensor exclusively is affected by the incident light as received by the light inlet.

Advantageously, the disclosed daylight harvesting system thereby comprises adequate means of measuring the characteristics of the continually changing light conditions of the incident light to allow the accurate information of flux (and colour point) of the sunlight (as defined by the incident light) captured by the daylight harvesting system to be communicated to the driving controls of the artificial light sources. This enables control of the artificial light sources. This may in turn enable effective means for accurately monitoring outside light (i.e. light at the light inlet) to allow the control of light inside an interior space, such as a room (i.e. at the light outlet). There is thus recited a specific placement of the light sensor, namely that it is placed such that the incident light received by the light sensor exclusively is affected by the incident light as received by the light inlet. The photo sensor is thereby advantageously arranged only to receive and measure incident light corresponding to that entering the light inlet. In addition there is recited a specific placement of the artificial light source, namely that it is placed at the light outlet. In combination this provides efficient redistribution of the daylight within the interior space and also efficient and seamless integration of the output light with the light provided by the artificial light source. An observer located in the interior space may thereby not be able to distinguish the artificial light source's light from the light outlet's light. Furthermore, the disclosed sensor location and orientation is optimal since this connects the collected daylight flux (intensity and color point) at the light inlet with the illuminance at the light outlet in a one-to-one and nearly linear relation.

In general, the light sensor may determine the light flux, intensity, and/or correlated color point of the daylight (i.e. incident light).

The daylight harvesting system may further comprise a shadow casting element arranged to block direct light of the incident light to provide an area comprising indirect light, wherein at least a first sub-area of the area comprises direct and indirect light and at least a second sub-area of the area exclusively comprises indirect light, and wherein the light sensor is arranged to receive and measure the light of the first sub-area and the second sub-area, respectively.

The daylight harvesting system may further comprise a reflective surface upon which the area is formed, and wherein the light sensor is an image sensor arranged to image the reflective surface.

The reflective surface may be tiltedly arranged in relation to a substantially horizontal plane so as to increase the degree of illumination. This may increase the accuracy of the measurement.

The shadow casting element may be a part of the light sensor.

The light sensor may be arranged to determine a difference in direct light contribution between at least the first sub-area and the second sub-area.

The light sensor may comprise at least one filter that matches light responsivity of a human eye.

The light distribution device of the daylight harvesting system may further comprise light transporting means arranged to transport light from the light inlet to the light outlet, and wherein the light transporting means comprises one from a window, a light tube or a fibre optical cable.

The daylight harvesting system may further comprise a dome, wherein the light sensor is arranged between the dome and the light inlet.

The daylight harvesting system may further comprise the artificial light source arranged to receive the control signal, and wherein the artificial light source is arranged to provide light as a function of the control signal.

The light sensor may further be placed relative the light inlet such that the incident light received by the light sensor further has essentially the same direct light contribution as the incident light that enters the light inlet.

The light sensor may be arranged to provide the control signal to a plurality of artificial light sources, each artificial light source of the plurality of artificial light sources being arranged at individual light outlets.

According to a second aspect of the invention, the above object and other objects are achieved by at least one luminaire comprising a daylight harvesting system as disclosed above.

According to a third aspect of the invention, the above object and other objects are achieved by a lighting control system comprising at least one daylight harvesting system as disclosed above.

According to a fourth aspect of the invention, the above object and other objects are achieved by a method for providing a daylight harvesting system, comprising providing a light distribution device comprising a light inlet for receiving incident light, and a light outlet for providing output light received by the light inlet into an interior space, providing a light sensor arranged to receive and measure a light level of the incident light and to provide the measurement signal representative thereof, and providing control circuitry arranged to receive the measurement signal from the light sensor, wherein the control circuitry is further arranged to provide a control signal based on the measurement signal to an artificial light source placed at the light outlet, wherein the light sensor is provided relative the light inlet such that the incident light received by the light sensor exclusively is affected by the incident light as received by the light inlet.

It is noted that the invention relates to all possible combinations of features recited in the claims. Thus, all features and advantages of the first aspect likewise apply to the second, third and fourth aspects, respectively.

DETAILED DESCRIPTION OF THE EMBODIMENTS

Figure 1:
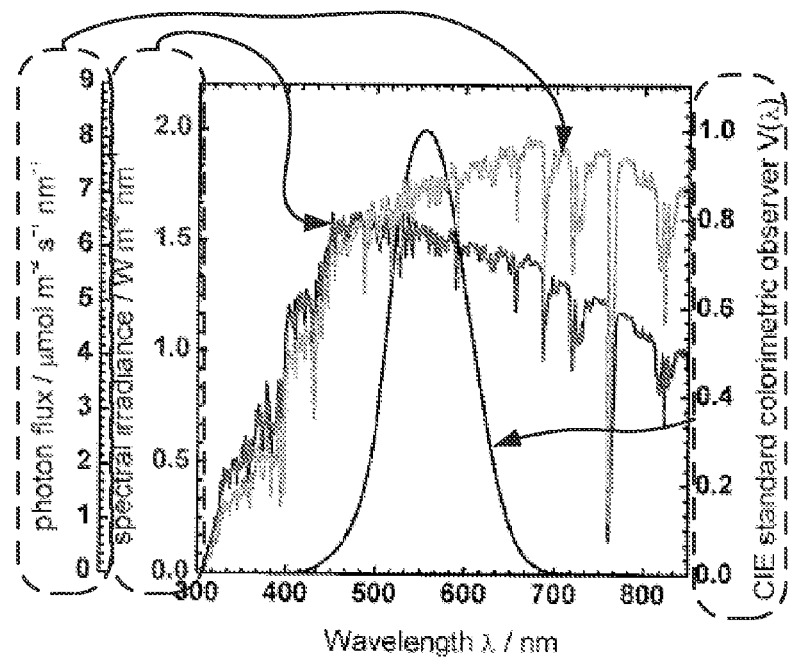
FIG. 1 illustrates photon flux and spectral irradiance of direct sunlight.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

The terms "upstream" and "downstream" as used herein relate to an arrangement of items or features relative to the propagation of light from a light source. Relative to a first position within a beam of light from the light source, a second position in the beam of light closer to the light source is "upstream", and a third position within the beam of light further away from the light source is "downstream".

The term "light axis" as used herein relate to an axis in which direction light is propagated downstream of a light source, e.g. from the entry aperture of a light tube to the exit aperture of said light tube. Thus, by for example "the light axis relative the light tube" is meant a light axis directed downstream of the light tube exit.

Natural light may generally be defined as light received on Earth from the sun, either directly or after reflection from the Moon. The prime characteristic of natural light is its variability. Natural light varies in flux, intensity and spectrum—both in time and location. Daylight can generally be divided into three components: direct sunlight, diffuse skylight and ground-reflected light. Sunlight is defined as light received at the Earth's surface, directly from the sun. Sunlight generally produces strong, sharp-edged shadows. Skylight is defined as light from the sun received at the Earth's surface after scattering in the atmosphere. This scattered light gives the sky its blue appearance, as compared to the blackness of space. The illuminance on the Earth's surface produced by daylight can cover a large range, from 150000 lux (e.g. on a sunny summer's day) down to 1000 lux (e.g. on a heavily overcast day in winter). The contribution of each of these daylight components is varying strongly in time. In summary, the daylight illuminance for the individual contributions yields direct sunlight: 32000 to 130000 lux within $6 \cdot 10^{-5}$ sr=2.5 square degrees diffuse skylight: 10000 to 25000 lux overcast day: 1000 lux The dominant contribution to the terrestrial daylight is that of the direct sunlight. The spectrum of the sun closely matches that of a black body radiator at 5800 K. As the sunlight travels through the atmosphere narrow spectral absorption bands are created by the air molecules. For the characterization of terrestrial photovoltaic panels the reference spectrum A.M. 1.5 is generally accepted (A.M.=air mass, that corresponds to the travel distance of the sunlight up to the terrestrial surface under a solar zenith angle of 78°). This spectrum is shown in FIG. 1 and yields $10^3$ W/m² and $1.2 \cdot 10^5$ lumen/m². It can be observed that most of the solar irradiance is in the (far) infra-red and that the efficacy of the sun is limited between 80 and 130 lm/W.

Figure 2:
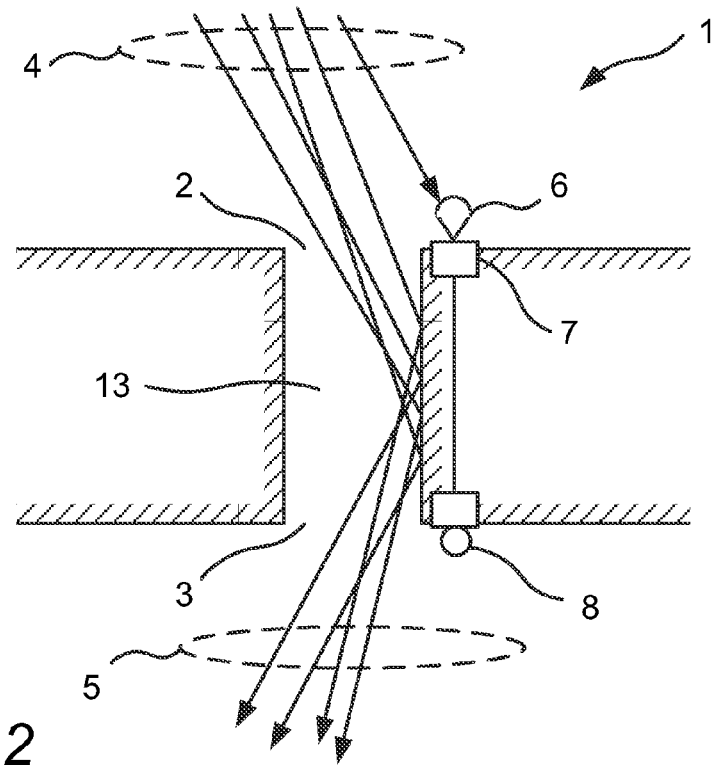
FIGS. 2-4 illustrate daylight harvesting systems according to embodiments.

With reference to FIG. 2, there is disclosed a daylight harvesting system 1 for transporting light in a light distribution device comprising a light inlet 2 and a light outlet 3. The light inlet 2 is thus arranged for receiving incident light 4, and the light outlet 3 is arranged for providing output light 5 received by the light inlet 2. A method for providing a daylight harvesting system 1 for transporting light from a light inlet 2 to a light outlet 3 thus comprises, in a step S2, providing a light distribution device comprising a light inlet 2 for receiving incident light, and a light outlet 3 for providing output light as received by the light inlet 2 into an interior space. Light may be transported from the light inlet 2 to the light outlet 3 by light transporting means 13. According to the embodiment of FIG. 3 the light transporting means 13 are defined by a light tube 15. However, the disclosed subject matter is not limited to light tubes; other light transporting means are equally possible and will be further elaborated below. For example, according to the arrangement 1b of FIG. 4 the light transporting means 13 are defined by a window element 19.

Commercially available light tubes provide an efficient means for transporting daylight into a building due to its high transport efficiency. The inner surface of the light tube 15 is therefore generally highly reflective; it is typically fitted with a highly reflective foil, or the like. In such a light tube 15 the daylight is transported through air (with substantially zero absorption) and the highly reflective inner surface typically has a minimal and spectrally flat absorption (typically less than 1%). Hence, the colour temperature of the daylight is retained even when the daylight is transported through the light tube 15. As a result thereof the impression of connectivity is increased, i.e. that the light 5 at the inside of the building highly resembles the light 4 at the outside of the building.

The time variation of direct sunlight is high: the hourly and seasonal variation of the sun's position in the hemisphere modifies both flux and directionality of the direct sunlight in a predictable manner. Additionally, local meteorological conditions modify the flux of both the direct sunlight and diffuse skylight in a highly irregular manner. However, since the light tube also collects and transports diffuse skylight (as opposed to a fibre based daylight collection system) there has previously not been identified any need to provide the light tube arrangement (daylight harvesting system) with means for actively tracking the sun's movement over the day and over the seasons so as to direct the inlet of the light tube towards the sun.

Figure 3:
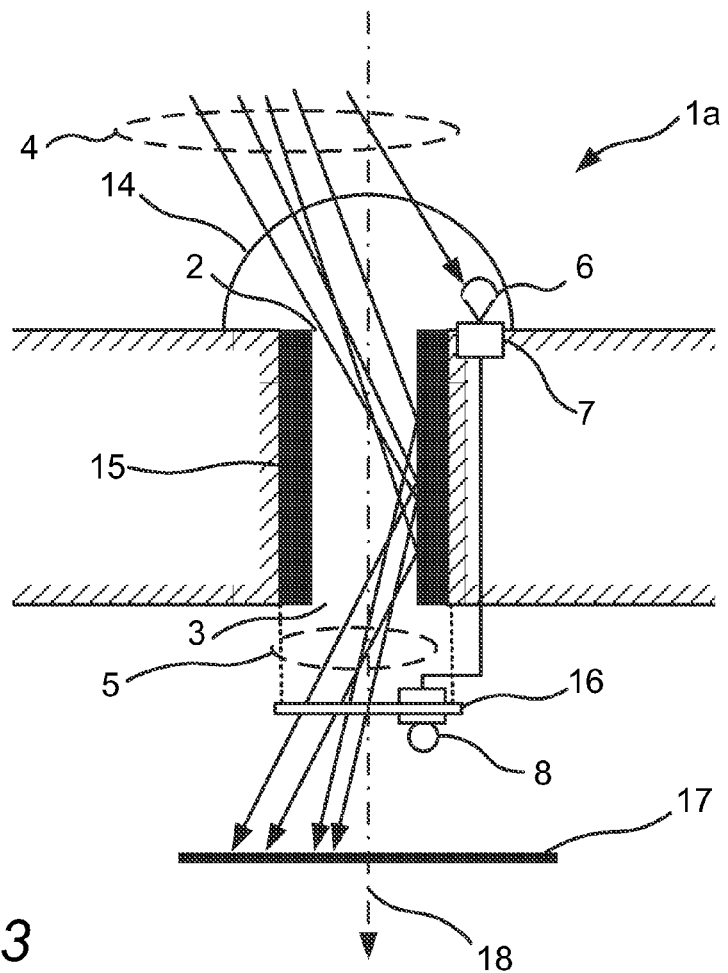

According to embodiments the light transporting means 13, such as the light tube 15, may be combined with a re-directional structure 16 having a pendant luminaire in order to redistribute the light exiting the light tube at the light outlet 3 in a controlled way. Furthermore, the daylight harvesting system may be provided with one or more artificial light sources 8 (such as LEDs) to enhance and/or complement the daylight whenever necessary to reach a desired light level, lighting effect or light color. Such a daylight harvesting system is generally referred to as a hybrid daylight harvesting system. An example of such a daylight harvesting system 1a is illustrated in FIG. 3.

A light sensor 6 is used in order to provide a reference and/or measurement forming a control signal to drive the one or more artificial light sources 8. Particularly, the light sensor is arranged to receive and measure a light level of the incident light. The incident light generally comprises direct light and indirect light. The TIAM2 color sensor from MAzet is one example of a suitable and commercially available light sensor. The light sensor 6 may comprises at least one filter that matches light responsivity of a human eye. The light sensor 6 is further arranged to provide a measurement signal representative of the measurement to control circuitry 7 arranged to receive the measurement signal. A method for providing an arrangement for transporting light from a light inlet 2 to a light outlet 3 thus further comprises, in a step S4, providing a light sensor 6 arranged to receive and measure a light level of the incident light and to provide the measurement signal representative thereof.

The control circuitry 7 is further arranged to provide a control signal based on the measurement signal to the one or more artificial light sources 8 placed at the light outlet 3. The one or more artificial light sources 8 placed at the light outlet 3 such that the light therefrom is seamlessly integrated with the output light from the light outlet 3. Particularly, the one or more artificial light sources 8 may be placed at the rim of the light outlet (as in FIG. 2) or at a re-directional structure 16 arranged at the light outlet 3 (as in FIG. 3). According to embodiments the daylight harvesting system 1, 1a, 1b thus further comprises the artificial light source 8 arranged to receive the control signal. The one or more artificial light sources 8 is/are then arranged to provide light as a function of the control signal. A method for providing an arrangement for transporting light from a light inlet 2 to a light outlet 3 thus further comprises, in a step S6, providing control circuitry 7 arranged to receive the measurement signal from the light sensor 6, wherein the control circuitry 7 is further arranged to provide a control signal based on the measurement signal to one or more artificial light sources 8 placed at the light outlet 3. The control circuitry 7 is thereby able to drive and control the one or more artificial light sources 8. Thereby the one or more artificial light sources 8 is/are controlled based on the measurement of the light sensor 6. Electronically available (online) local weather information may be used as a compliment to the light sensor 6 wherefrom the control circuitry 7 directly may obtain the required parameters can be directly obtained via a WLAN network chip comprised in the control circuitry 7.

According to embodiments, the daylight harvesting system 1, 1a, 1b further comprises the re-directional structure 16 arranged at the light outlet 3. The re-directional structure 16 may comprise a diffuser and/or a pendant luminaire. As noted above the one or more artificial light sources 8 may be arranged at the re-directional structure 16, as illustrated in FIG. 3.

However, the inventors of the herein disclosed embodiments have discovered that in order to drive and control the one or more artificial light sources 8 efficiently in such a hybrid daylight harvesting system configuration it may be beneficial to know the flux and/or colour of the daylight. The inventors of the herein disclosed embodiments have further discovered that this is not straightforward due to the variation of the daylight, inter alia in terms of intensity, color point and directionality. High requirements are thus needed for the light sensor 6 in order to monitor flux, intensity and correlated colour temperature (CCT). In general, dispersive elements provide spectral information at the expense of directional information. Moreover, the angular field of view needs to be large given the variation of the sun's position on the hemisphere. Thirdly, the dynamic variation in daylight spans from the order 10 lux to the order 150 000 lux. In case one would like to measure both the direct and diffuse component, the direct sunlight, if present, is likely to completely dominate the flux.

Furthermore, the inventors of the herein disclosed embodiments have also discovered that the process of daylight transportation itself alters these parameters and that the daylight (in combination with the artificial light) thereby is redistributed into the room at the outlet of, for example, the light tube 15. Using a highly reflective tubular system for light transportation reduces the changes in colour point. However, the light intensity will be reduced and its directionality will also be completely altered. As the degree of modification of the daylight parameters is not static, e.g. the amount of reduction in light intensity generally depends on the angle of incidence, the connection between the parameters of the outside light 4 (i.e. at the light inlet 2) and the parameters of the inside light 5 (i.e. at the light outlet 3) is not a straightforward one.

The inventors of the herein disclosed embodiments have particularly discovered that if the light sensor 6 is positioned in a certain way there will be a one-to-one and nearly linear relation between the light sensed by the light sensor 6 and the light distribution at the light outlet 3. More particularly, the light sensor 6 should be positioned at the light inlet 2, for example under the dome 14 of the light tube 15 in the horizontal plane (the horizontal plane generally defined as being perpendicular to the light axis of the light tube).

Specifically, the light sensor 6 is placed relative the light inlet 2 such that (at a given time interval) the incident light received by the light sensor 6 exclusively is affected by the incident light as received by the light inlet. The light sensor 6 may further be placed relative the light inlet 2 such that (at a given time interval) the incident light received by the light sensor 6 furthermore has at least one light property in common with the incident light that enters the light inlet 2. The at least one light property may at least pertain to total flux of the incident light. The light sensor 6 may further be placed relative the light inlet 2 such that (at a given time interval) the incident light received by the light sensor 6 furthermore has (essentially) the same direct light contribution as the incident light that enters the light inlet 2.

The light sensor may thus advantageously be arranged between the dome 14 of the light transporting means 13 and the light inlet 2. At this entry level of the daylight/sunlight accurate sensing can be achieved due to the fact that the light is hitting the light sensor 6 directly, without the redistribution of the light due to the reflections which may occur in the light transporting means 13.

The found optimal position is counter-intuitive as a person skilled in the art would measure the light distribution in the room (i.e. at the light outlet 3) to determine the amount of daylight distributed in the room. However, the inventors of the herein disclosed embodiments have realized that this measurement position would suffer from unequal daylight distributions and distribution variations in time in the room. If the light sensor 6 is positioned at the light outlet 3 there would thus be large errors in estimating the total amount of transported daylight based on measurements of the light sensor 6.

Figure 5:
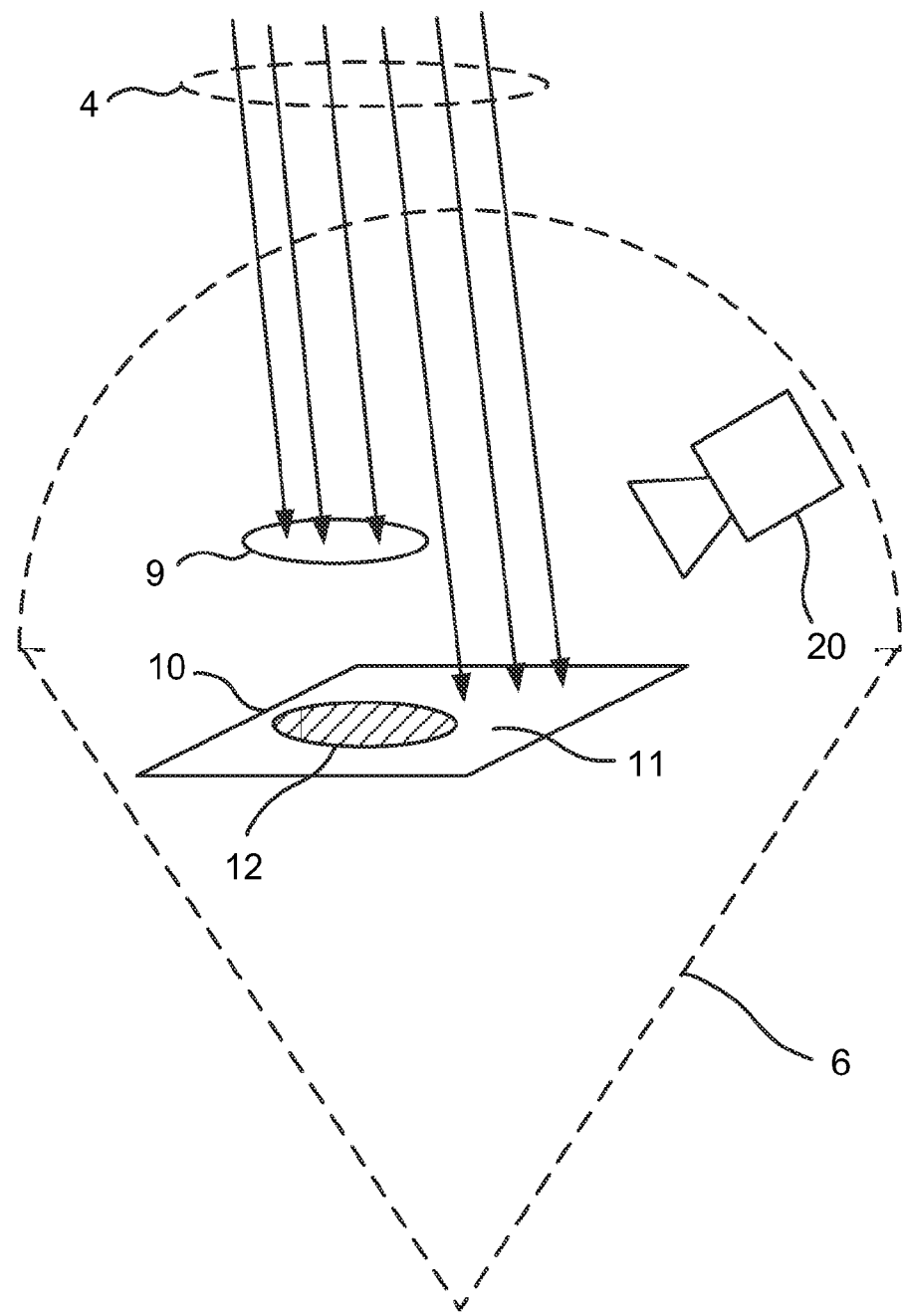
FIG. 5 illustrates a light sensor according to embodiments.

According to embodiments, the daylight harvesting system 1 further comprises a shadow casting element 9, as illustrated in FIG. 5. The shadow casting element 9 is arranged to reflect the direct light contribution of the incident light 4 in order to provide an area comprising indirect light. The shadow casting element 9 may be a part of the light sensor 6 itself. Alternatively the shadow casting element 9 could be defined by a well positioned connector or connector cable of the shadow casting element 9. For even more improved performance the (white) reflective surface area 10 may be somewhat tilted such that the direct sunlight contribution averaged over time will be maximal. The actual tilt of the (white) reflective surface area 10 may thus depend on the geographical coordinates of the installation point. Particularly, the (white) reflective surface area 10 may be tiltedly arranged in relation to a substantially horizontal plane (i.e., perpendicular to a gradient of the gravity field of the Earth).

The area 10 comprising indirect light may additionally comprise direct light. Thus at least a first sub-area 11 of the area 10 may comprises direct light, whereas at least a second sub-area 12 of the area 10 exclusively comprises indirect light. According to this embodiment the light sensor 6 is then further arranged to receive and measure the light of the first sub-area 11 and of the second sub-area 12, respectively. One way to obtain such an arrangement is to apply a (white) reflective surface area 10 in combination with the shadow casting element 9 together with an image sensor for monitoring the (white) reflective surface area 10. An image sensor 20 may thus be used as part of the light sensor 6, where the image sensor 20 thus is arranged to image the (white) reflective surface. As a result thereof the (white) reflective surface 10 will thus consist of two illuminated sub-areas: a first sub-area 11 that reflects both diffuse and direct light and second sub-area 12 that due to the movement of the sun changes position over the day and solely reflects the diffuse light. The (white) reflective surface area 10 will thus act as a mirror for the light flux coming from the whole hemisphere and additionally preserve spectral information. In order to differentiate the diffuse skylight contribution from the direct sunlight the image sensor may only need to monitor the image screen. As noted above the shadow casting element 9 may be a part of the light sensor 6 itself. For example, according to the embodiment as illustrated in FIG. 5 the image sensor 20 may be positioned at the location of the shadow casting element 9 and hence also function as a shadow casting element, thereby removing the need for having a separate shadow casting element.

Principles of the present embodiment may be similar to those associated with the process of integrating spheres where both flux and spectral information can be measured simultaneously. However, according to the present embodiment information relating to the directional information is the most important parameter. In order to determine this parameter, the light sensor 6 may be arranged to determine the contrast created by the fully illuminated area 11 and the area 12 from which the directional light has been blocked via the shadow casting element 9. The light sensor 6 is thereby arranged to determine a difference in direct light contribution between at least the first sub-area 11 and the second sub-area 12.

Considering the broadband spectrum of daylight a commercial image sensor with Bayer filter (a Bayer filter mosaic is generally a color filter array (CFA) for arranging RGB color filters on a square grid of photosensors) will suffice to determine the CCT. A sensor calibration procedure may therefore be required to determine the absolute illuminance, as generally, sensor software automatically adjusts the gamma correction and gain control for optimal imaging performance.

A luminaire may comprise at least one of the herein disclosed daylight harvesting systems 1, 1a, 1b. A building generally comprises a plurality of such luminaires. The communications channel between the light sensor and the luminaire(s) may be either wired or wireless. A wireless communications channel may have the advantage that the sensing ability for the whole building may be accomplished with one single light sensor 6, i.e. without connecting and hard-wiring procedures for each individual luminaire during installation. Particularly, the light sensor 6 may be arranged to provide the control signal to a plurality of artificial light sources 8. Each artificial light source of the plurality of artificial light sources 8 may be arranged at individual light outlets 3. The luminaire settings may thereby be controlled via a (single) digital signal processor and microcontroller that wirelessly receives and evaluates the daylight information. Subsequently preset protocols can be executed to create the desired illumination for each individual luminaire.

Figure 6:
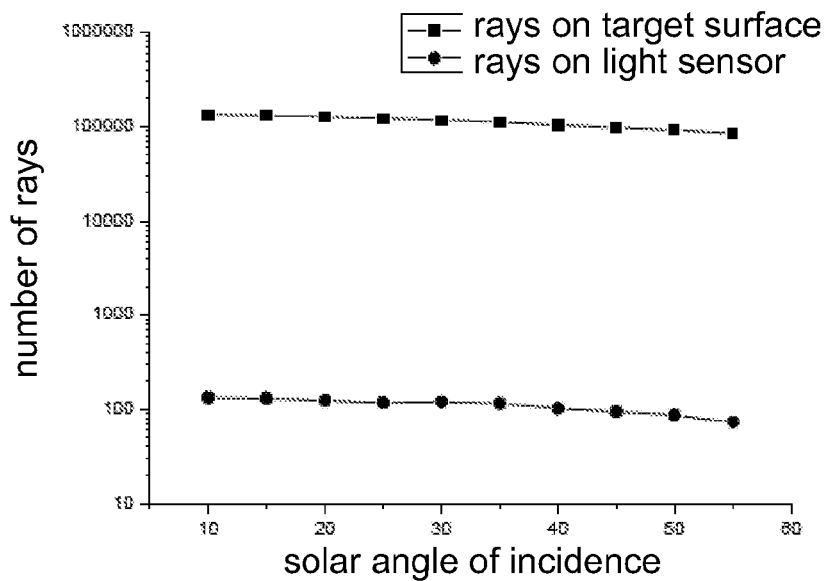
FIG. 6 illustrates experimental measurement results according to an embodiment.
Figure 7:
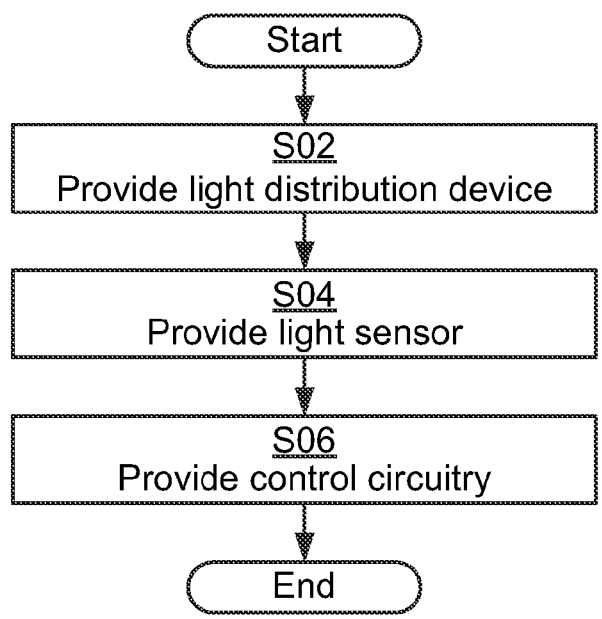
FIG. 7 is a flowchart of a method according to an embodiment.

The changing light intensity at the light inlet 2, where the light sensor 6 is located, has been modeled and simulated for different solar angles of incidence. This intensity has then been compared to the light that would hit a target surface 17 after passing through the light tube 15 and the re-directional structure 16. The target surface 17 is arranged to be substantially perpendicular to the light axis 18 and placed beyond the light outlet 3 and the re-directional structure 16 and may thus represent a floor. The light at this target surface 17 thus represents the light that a user would actually experience. The light fluxes and distributions have been simulated for different direct sunlight entries. In FIG. 6 experimental measurement results of the number of light rays is plotted against the solar angle of incidence for two measurements. The results thus indicate a one-to-one and nearly linear relation between the direct sunlight as sensed by the light sensor 6 at the light inlet 2 (i.e. outside the building) and the light distribution as measured at target surface 17 representing a floor of the building.

Figure 4:
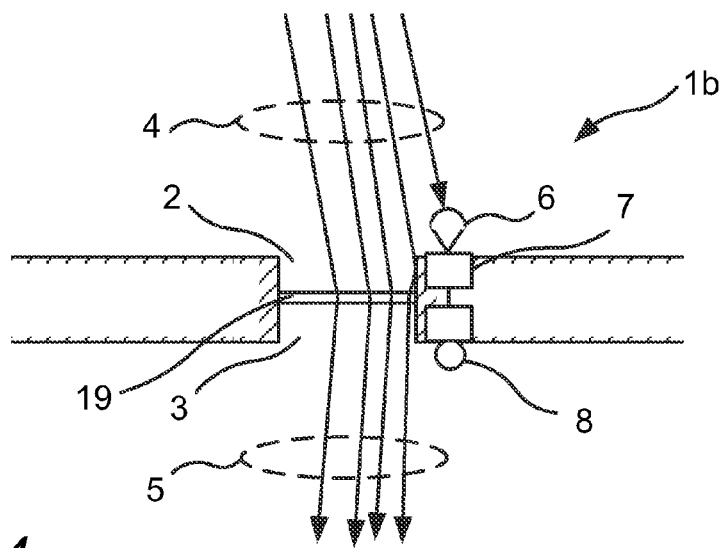

Further, although the arrangements (daylight harvesting systems) and methods of the preferred embodiments have been disclosed in the context of light tubes 15 the disclosed arrangements (daylight harvesting systems) and methods may also be used for windows as is illustrated in FIG. 4. In general terms, the light inlet 2 may represent a first surface of a window element 19 arranged to face outwards the building, whilst the light outlet 3 may represent a second surface of the window element 19 arranged to face inwards the building. The window element 19 may comprise one or more light reflective and/or light transporting elements, such as one or more sheets of window glass. The first and second surfaces, respectively, may thus be opposite surfaces of the same window glass (for a single glazed window) or different surfaces of different window glasses (for double or triple glazed windows) of the window element 19. Outside light 4 is thus received at the first surface and distributed into the building as inside light 5 at the second surface.

The person skilled in the art thus realizes that the present invention by no means is limited to the preferred embodiments described above. On the contrary, many modifications and variations are possible within the scope of the appended claims. For example, the disclosed arrangement can be a part of other types of daylight guiding systems, such as anidolic ceilings, lightpipes, and the like.

The invention claimed is:

1. A daylight harvesting system, comprising:
a light distribution device comprising a light inlet for receiving incident light, and a light outlet for providing output light received by the light inlet into an interior space,
a light sensor arranged to receive and measure a light level of the incident light and to provide a measurement signal representative thereof, wherein the light sensor is placed relative the light inlet such that the incident light received by the light sensor exclusively is affected by the incident light as received by the light inlet,
control circuitry arranged to receive the measurement signal, and to provide a control signal based on the measurement signal to an artificial light source placed at the light outlet, and
a shadow casting element arranged to block direct light of the incident light to provide an area comprising indirect light, wherein at least a first sub-area of the area comprises direct and indirect light and at least a second sub-area of the area exclusively comprises indirect light, and wherein the light sensor is arranged to receive and measure the light of the first sub-area and the second sub-area, respectively.

2. The daylight harvesting system according to claim 1, further comprising a reflective surface upon which the area is formed, and wherein the light sensor is an image sensor arranged to image the reflective surface.

3. The daylight harvesting system according to claim 2, wherein the reflective surface is tiltedly arranged in relation to a substantially horizontal plane.

4. The daylight harvesting system according to claim 1, wherein the shadow casting element is a part of the light sensor.

5. The daylight harvesting system according to claim 1, wherein the light sensor is arranged to determine a difference in direct light contribution between at least the first sub area and the second sub-area.

6. The daylight harvesting system according to claim 1, wherein the light sensor comprises at least one filter that matches light responsivity of a human eye.

7. The daylight harvesting system according to claim 1, wherein the light distribution device further comprises light transporting means arranged to transport light from the light inlet to the light outlet, and wherein the light transporting means comprises one from a window, a light tube or a fibre optical cable.

8. The daylight harvesting system according to claim 1, further comprising a dome, and wherein the light sensor is arranged between the dome and the light inlet.

9. The daylight harvesting system according to claim 1, further comprising the artificial light source arranged to receive the control signal, and wherein the artificial light source is arranged to provide light as a function of the control signal.

10. The daylight harvesting system according to claim 1, wherein the light sensor further is placed relative the light inlet such that the incident light received by the light sensor further has essentially the same direct light contribution as the incident light that enters the light inlet.

11. The daylight harvesting system according to claim 1, wherein the light sensor is arranged to provide the control signal to a plurality of artificial light sources, each artificial light source of the plurality of artificial light sources being arranged at individual light outlets.

12. A luminaire comprising at least one daylight harvesting system according to claim 1.

13. A lighting control system comprising at least one daylight harvesting system according to claim 1.

* * * * *